United States Patent
Yamaguchi et al.

(10) Patent No.: US 9,400,508 B2
(45) Date of Patent: Jul. 26, 2016

(54) PERIODICITY DISTURBANCE SUPPRESSION DEVICE AND PERIODICITY DISTURBANCE SUPPRESSION METHOD

(75) Inventors: Takashi Yamaguchi, Tokyo (JP); Yugo Tadano, Tokyo (JP); Kazunobu Oi, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 474 days.

(21) Appl. No.: 14/111,097

(22) PCT Filed: Apr. 11, 2012

(86) PCT No.: PCT/JP2012/059855
§ 371 (c)(1),
(2), (4) Date: Oct. 10, 2013

(87) PCT Pub. No.: WO2012/141190
PCT Pub. Date: Oct. 18, 2012

(65) Prior Publication Data
US 2014/0039694 A1    Feb. 6, 2014

(30) Foreign Application Priority Data

Apr. 15, 2011 (JP) ................................ 2011-090733
Aug. 29, 2011 (JP) ................................ 2011-185551

(51) Int. Cl.
*G05D 19/02* (2006.01)
*G05B 13/04* (2006.01)

(52) U.S. Cl.
CPC .............. *G05D 19/02* (2013.01); *G05B 13/042* (2013.01)

(58) Field of Classification Search
CPC ..................................................... G05D 19/02
USPC ................................ 318/400.04, 400.01, 700
See application file for complete search history.

(56) References Cited

U.S. PATENT DOCUMENTS 5,150,030 A * 9/1992 Ito .............................. H02P 8/32
318/807

FOREIGN PATENT DOCUMENTS

| JP | 6-51805 A | 2/1994 |
| JP | 2000-330606 A | 11/2000 |
| JP | 2005-267296 A | 9/2005 |
| WO | WO 2010/24195 A1 | 3/2010 |

OTHER PUBLICATIONS

Tadano, Y. et al., "Periodic Learning Suppression Control of Torque Ripple Utilizing System Identification for Permanent Magnet Synchronous Motors", *The 2010 International Power Electronics Conference IEEE*. pp. 1363-1370 (2010).

* cited by examiner

Primary Examiner — David S Luo
(74) Attorney, Agent, or Firm — Foley & Lardner LLP

(57) ABSTRACT

In a torque ripple suppression control effected by a periodicity disturbance observer, it is necessary to consider plant fluctuation and fluctuation of plant characteristics caused by over time usage. Thus, improvement for robustness to an identification model error has been required. For fulfilling this requirement, there is provided a system that includes a phase correction amount calculation portion 11 that derives a phase correction amount by calculating a phase of a vector trajectory drawn by a frequency component of the periodicity disturbance, a gain correction amount calculation portion 12 that derives a gain correction amount by calculating a progress speed of the vector trajectory drawn by the frequency component of the periodicity disturbance and comparing the calculated progress speed with a threshold value and a rotation vector calculation portion 13 that derives a system identification model correction value by multiplying the phase correction amount by the gain correction amount and corrects the system identification model of a periodicity disturbance observer portion 14 based on the system identification model correction value.

14 Claims, 9 Drawing Sheets

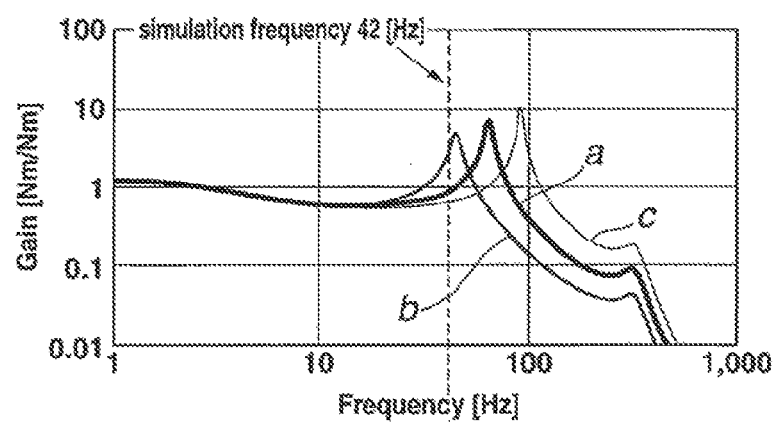
FIG.6(a)
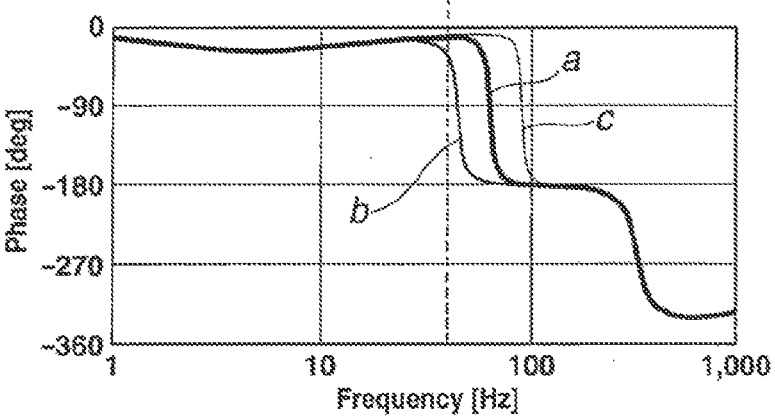
FIG.6(b)
FIG.7(a)
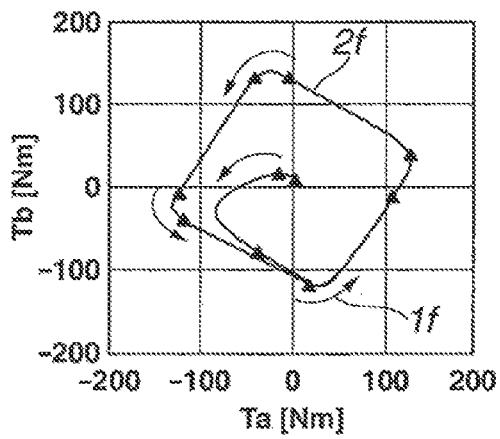
FIG.7(b)
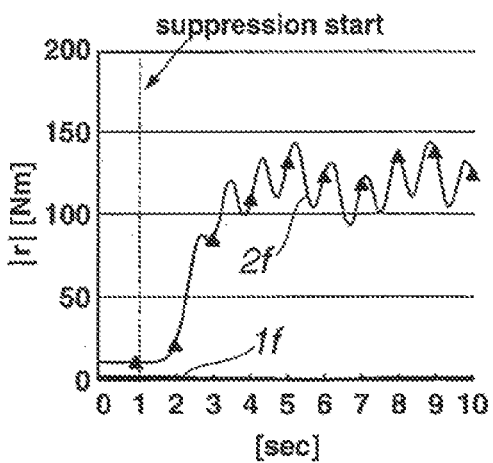
FIG.7(c)
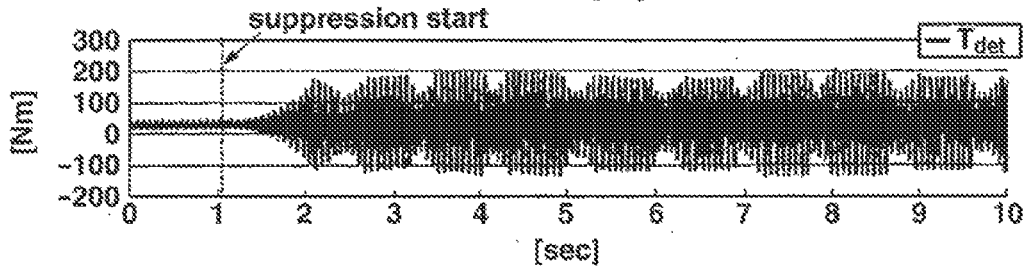

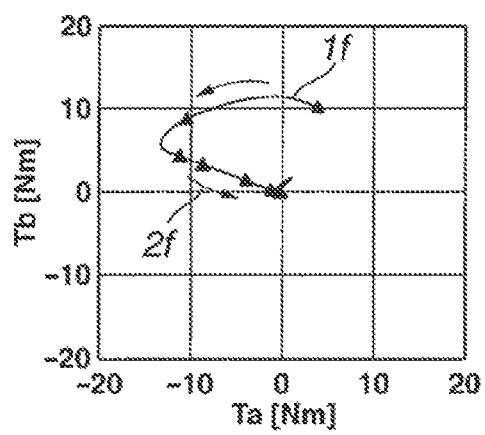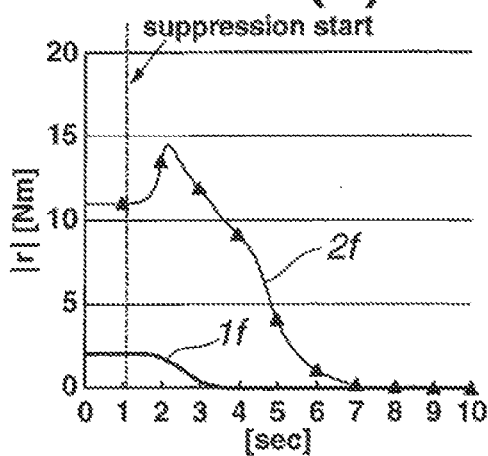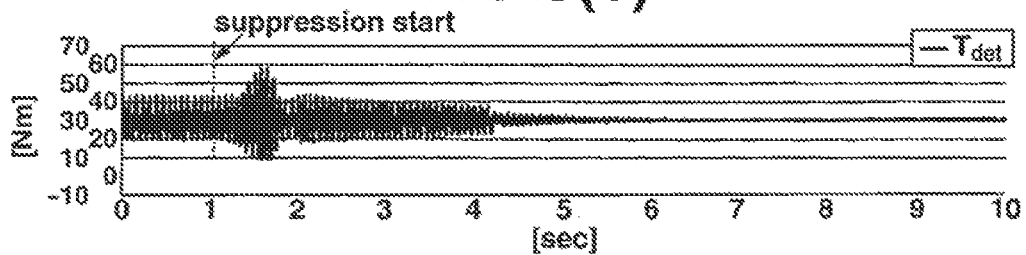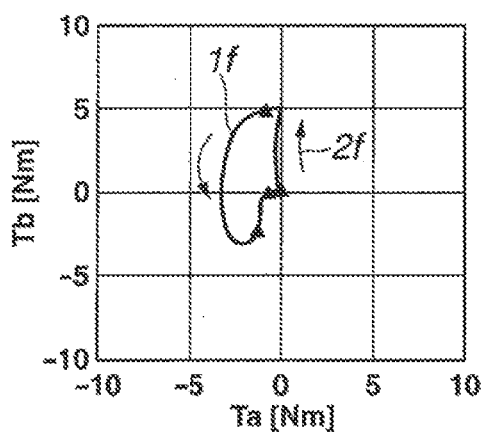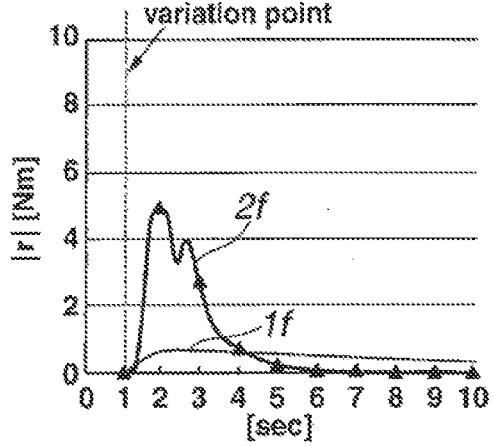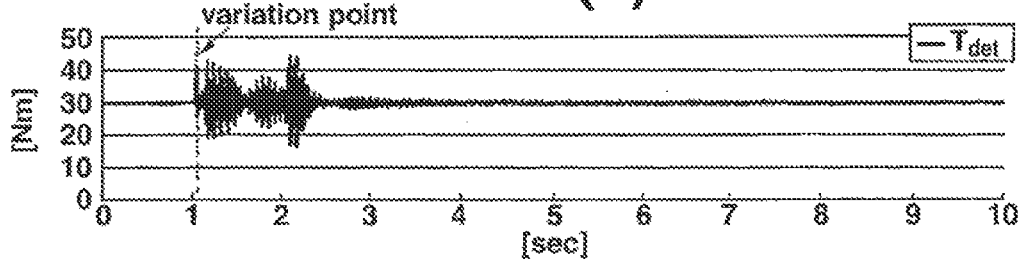

PERIODICITY DISTURBANCE SUPPRESSION DEVICE AND PERIODICITY DISTURBANCE SUPPRESSION METHOD

TECHNICAL FIELD

The present invention relates to a periodicity disturbance suppression device and a suppression method for suppressing a periodicity disturbance produced by a controlled object.

BACKGROUND ART

When a control device with a learning function and a motor control device are in operation, a controlled object sometimes produces a periodicity disturbance.

In case of for example an electric motor as the controlled object that produces the periodicity disturbance, a pulsation called as torque ripple is produced, which causes various problems, such as vibration, noises, poor riding comfort, resonance of machines etc. Particularly, in widely used magnet embedded type synchronous motors (which will be called PM motor hereinafter), cogging torque ripple and reluctance torque ripple are complicatedly produced. For suppressing the production, various methods for suppressing the torque ripple by electrically applying compensation signals to a controlled object to cancel pulsation have been known.

The methods can be roughly grouped into two, one being a feedforward compensation method that compensates the torque ripple based on an approximate expression and an analytical result of electromagnetic field and the other being a feedback method.

The feedback method is grouped into a method in which learning is carried out through a torque meter, a method in which suppression control is carried out by estimating a torque ripple from a motor current ripple and a torque ripple disturbance observer method in which suppression control is carried out based on current value and rotation speed value detected. Although these feedback methods can handle a ripple characteristic fluctuation online, these methods have an approximation error that is inevitably produced when the torque ripple is estimated from the current ripple and a limitation on frequency band that is exhibited by a disturbance observer filter when working in a high frequency band.

The torque ripple is a periodicity disturbance produced by a rotational fluctuation degree of the motor, and a higher order component of the periodicity disturbance tends to match with a machine resonance frequency even when the motor runs at a lower speed. Accordingly, in case of applying a learning control to a variable speed drive system of oscillatory type, it is necessary to consider counter-measures against unstable phenomena caused by sudden changes in amplitude and phase reversal. For achieving this, it is generally necessary to ask the assistance of a complicated high order model and a suitable control/adjustment of the model, and thus, effective control of the periodicity disturbance like the torque ripple is difficult. Measures for suppressing such periodicity disturbance are known from Patent Document-1.

In the measures of Patent Document-1, as is seen from FIG. 18, a torque command Tref is inputted to a command value converting portion 1 to produce current commands id* and iq* of d and q axes of a rotating coordinate system (mutually perpendicular dq axes) that is synchronized with rotation of the electric motor, and the current commands are inputted to an inverter 2 (vector controlling device) to be subjected to a vector controlling. Based on the current commands id* and iq*, the inverter 2 produces an output to control a PM motor 3 to which a load is connected through a shaft. A shaft torque detected value Tdet detected by a torque detecting device mounted to the shaft and a rotor phase angle θ detected by a position detecting device mounted to the shaft are inputted into an observer portion 4.

In the observer portion 4, a periodic pulsation of the PM motor 3 is detected as a direct current by a frequency component extraction means of Fourier transforming (Fourier transform portion FT), and a periodicity disturbance on the frequency component is estimated by a periodicity disturbance observer compensating portion 4a, and the estimated value is added to the current command iq* in a manner to suppress the periodicity disturbance.

Denoted by SC in FIG. 18 is n-order (or dimensional) sinusoidal/cosine wave generating portion, and Tr denotes a converting period and n denotes a compensating order (or degree).

The periodicity disturbance observer compensating portion 4a serves as one of control means suppressing a periodicity disturbance, and a basic construction of the compensating portion 4a is the same as that of a conventional disturbance observer, and the portion 4a controls disturbance components separately. By using a system identification model, which exhibits a complex vector for each frequency component, as a reversed system model of the disturbance observer, the disturbance of the frequency to be controlled is directly estimated and compensated. With this, a high control effect can be obtained against an intended frequency irrespective of the order, even though the controlling construction is relatively simple in construction.

PRIOR ART DOCUMENTS

Patent Documents

Patent Document-1: International Publication WO2010/24195A1

Non-Patent Documents

Non-Patent Document-1: Y. Tadano, et al. "Periodic Learning Suppression Control of Torque Ripple Utilizing System Identification for Permanent Magnet Synchronous Motors", IEEE IPEC-Sapporo, pp. 1363-1370 (2010).

SUMMARY OF INVENTION

Problems to be Solved by Invention

FIG. 19 is a control block diagram of a periodicity disturbance observer shown in Patent Document-1, with n-order (dimensional) components simply shown.

$P_n$: Plant, $P^{\wedge}n$: System identification model
$r_n$: control command
$d_n$: periodicity disturbance, $d^{\wedge}_n$: periodicity disturbance estimated value
$y_n$: output of controlled object
Attached $_n$ means n-order component.
The above variables are all complex vectors represented by $X_n = X_{An} + jX_{Bn}$.
$G_F(s)$: low-pass filter
controlled object=object to be controlled
PDO: Periodic Disturbance Observer (observer of periodic disturbance)

First, a system identification is previously applied to the plant $P_n$ that is the controlled object, and the result is represented as a first-order complex vector (1).

$$P^{\wedge}_n = P^{\wedge}_{AN} + jP^{\wedge}_{Bn} \tag{1}$$

It is to be noted that $P\hat{}_{An}$ is a real part of n-order component of identification result, and $P\hat{}_{BN}$ is an imaginary part of n-order component of identification result.

For example, in case of expressing the system identification result applied to 1 to 1000 Hz by using complex vector for every 1 Hz, it is possible to constitute a table that contains one thousand of elements of the first-order complex vector. It is also possible to express the identification result by approximation equation. In both measures, the system model can be always expressed by using simpler first-order complex vector.

It is to be noted that $P\hat{}_n$, $r_n$, $d_n$, $d\hat{}_n$, and $y_n$ that will appear in the following are complex vectors represented by $X_n = X_{An} + jX_{Bn}$.

For the controlling, the plant output (controlled object output $y_n$) is passed through a low-pass filter $G_F(s)$ that simplifies the Fourier transform, so that a frequency component that is the controlled object for the periodicity disturbance is extracted. The extracted frequency component is multiplied by a reversed system that is expressed by a reciprocal $P\hat{}_n^{-1}$ of the above-mentioned system identification model, and a difference between the result of the multiplication and the control command value $r_n$ produced by an upstream positioned controller is led to an adder A1 thereby to estimate a periodicity disturbance $d_n$. The estimated periodicity disturbance value $d\hat{}_n$, as a compensation command value, is subtracted from the control command value $r_n$ at an adder A2, so that the periodicity disturbance $d_n$ added to an adder A3 is suppressed. The above-mentioned flow is the controlling method for suppressing a periodicity disturbance by a periodicity disturbance observer.

The most important basis for the control in this controlling method is an accuracy with respect to a real value of the system identification model. In order to increase the suppression power for the periodicity disturbance, much higher accuracy is required by the system identification.

However, it is difficult to obtain a high accuracy system identification. That is, it is necessary to consider a plant fluctuation due to over time usage, a frequency maintenance to fluctuation of plant characteristic, etc. The error relative to the real value brings about increase in settling time until termination of the suppression control, and in the worst case, the suppression control itself constitutes a disturbance component by a phase error, which brings about a high possibility of unstable controlling. Accordingly, improvement for robustness to the identification model error has been required.

The present invention is provided for solving the above-mentioned problems, and an object of the present invention is provide a periodicity disturbance suppression device that is able to correct an error of a system identification model.

Means for Solving Problems

In order to solve the above-mentioned problems, a periodicity disturbance suppression device as defined in Claim 1 is characterized by having:

a periodicity disturbance suppression means that has at an upstream part thereof a controller that issues a control command value, and a periodicity disturbance observer portion by which a frequency component of a periodicity disturbance of a suppression-controlled object, which is output of a controlled-object that produces the periodicity disturbance, is multiplied by a reversed system that is expressed by a reciprocal of a system identification model thereby to estimate a periodicity disturbance, the periodicity disturbance estimated by the periodicity disturbance observer portion being, as a compensation command value, subtracted from the above-mentioned control command value thereby to suppress the periodicity disturbance;

a phase correction amount calculation means that derives a phase correction amount by calculating a phase of a vector trajectory that is drawn on a complex vector plane by each frequency component of the periodicity disturbance during the periodicity disturbance suppression control carried out by the periodicity disturbance suppression means;

a gain correction amount calculation means that corrects a gain of an output from the controlled object by inputting therein the output from the controlled object; and a rotational vector calculation means that calculates a system identification model correction value by multiplying together the phase correction amount from the phase correction amount calculation means and the gain correction amount from the gain correction amount calculation means, and corrects the system identification model of the periodicity disturbance suppression means based on the system identification model correction value.

A periodicity disturbance suppression device as defined in Claim 2 is a device that uses a motor as the controlled object, an output from the motor being inputted to the periodicity disturbance observer portion to estimate a periodicity disturbance, the estimated periodicity disturbance from the periodicity disturbance observer portion being, as a compensation command value, subtracted from the control command value to control the motor through an inverter, wherein:

the phase correction amount calculation means calculates a phase of the vector trajectory that is drawn by the frequency component of the periodicity disturbance by inputting therein the output of the motor;

the gain correction amount calculation means inputs therein the output of the motor to calculate a progress speed of the vector trajectory drawn by the frequency component of the periodicity disturbance, and compares the progress speed with a threshold value, and repeats the calculation and comparison for plural times to calculate a gain correction amount; and the rotational vector calculation means calculates the system identification model correction value by multiplying together the phase correction amount from the phase correction amount calculation means and the gain correction amount from the gain correction amount calculation means, and corrects the system identification model of the periodicity disturbance of the periodicity disturbance observer portion based on the system identification model correction value.

A periodicity disturbance suppression device as defined in Claim 3 is a device that is characterized in that the phase correction amount $\theta^{ref}_n$ provided by the phase correction amount calculation means is derived by adding a previously calculated phase correction amount $\theta^{ref}_{n-1}$ to the product of a weight a and a rotation angle $\theta$.

A periodicity disturbance suppression method as to defined in Claim 12 is characterized by having:

a periodicity disturbance suppression step that has at an upstream part thereof a controller that issues a control command value, and a periodicity disturbance observer portion by which a frequency component of a periodicity disturbance of a suppression-controlled object, which is output of a controlled-object that produces the periodicity disturbance, is multiplied by a reversed system that is expressed by a reciprocal of a system identification model thereby to estimate a periodicity disturbance, the periodicity disturbance estimated by the periodicity disturbance observer portion being, as a compensation command value, subtracted from the above-mentioned control command value thereby to suppress the periodicity disturbance;

a phase correction amount calculation step that derives a phase correction amount by calculating a phase of a vector trajectory that is drawn on a complex vector plane by each frequency component of the periodicity disturbance during the periodicity disturbance suppression control carried out by the periodicity disturbance suppression means;

a gain correction amount calculation step that corrects a gain of an output from the controlled object by inputting therein the output from the controlled object; and a rotational vector calculation step that calculates a system identification model correction value by multiplying together the phase correction amount from the phase correction amount calculation means and the gain correction amount from the gain correction amount calculation means, and corrects the system identification model of the periodicity disturbance suppression means based on the system identification model correction value.

A periodicity disturbance suppression method as defined in Claim 13 is a method that uses a motor as the controlled object, an output from the motor being inputted to the periodicity disturbance observer portion to estimate a periodicity disturbance, the estimated periodicity disturbance from the periodicity disturbance observer portion being, as a compensation command value, subtracted from the control command value to control the motor through an inverter, wherein:

the phase correction amount calculation step calculates a phase of the vector trajectory that is drawn by the frequency component of the periodicity disturbance by inputting therein the output of the motor;

the gain correction amount calculation step inputs therein the output of the motor to calculate a progress speed of the vector trajectory drawn by the frequency component of the periodicity disturbance, and compares the progress speed with a threshold value, and repeats the calculation and comparison for plural times to calculate a gain correction amount; and the rotational vector calculation step calculates the system identification model correction value by multiplying together the phase correction amount from the phase correction amount calculation means and the gain correction amount from the gain correction amount calculation means, and corrects the system identification model of the periodicity disturbance of the periodicity disturbance observer portion based on the system identification model correction value.

With the above-mentioned characterization, errors of the system identification model used as the periodicity disturbance observer can be suitably corrected, and thus, robustness against the errors of the identification model can be increased.

A periodicity disturbance suppression device as defined in Claim 4 is characterized in that a learning function portion is provided at an output side of the rotational vector calculation means, a system identification model correction value derived by the rotational vector calculation means is memorized in the learning function portion, a correction value to an error of the system identification model is learned, a learned value is inputted to the periodicity disturbance observer portion and multiplied by the identification model correction value to produce updated identification model correction value.

With the above-mentioned characterization, learning (memorization) of a correction value to an error of the identification model of a given frequency is possible, and thus, a learning time until completion of the correction during repeated operation with the identical frequency can be shortened or no learning may be needed.

A periodicity disturbance suppression device as defined in Claim 5 is characterized in that an identification model correction function portion is provided to the learning function portion, moving/changing of an operation point at the time when the system identification model correction value is stored is repeated by the identification model correction function portion, when the movement of the operation point is finished, a suppression control for the periodicity disturbance is turned ON, and when the suppression control is completed, the suppression control for the periodicity disturbance is turned OFF while storing the system identification model correction value.

With the above-mentioned characterization, the suppression control can be completed by the model correction function even when the system identification has an error, and at the same time, it is possible to obtain a new identification model.

A periodicity disturbance suppression device as defined in Claim 6 is characterized in that the learning function portion is provided with an interpolation correction means, so that the system identification model correction value after learning can have any frequency range.

With the above-mentioned characterization, by affecting the result of the learning on a specialized frequency to a surrounding frequency range, the time needed for stabilizing and learning the suppression control upon fluctuation of the frequency can be shortened.

A periodicity disturbance suppression device as defined in Claim 7 is characterized in that the phase correction amount calculation means, the gain correction amount calculation means and the rotatable vector calculation means are respectively provided with n-order components of the frequency of the periodicity disturbance.

With the above-mentioned characterization, even when a plurality of periodicity disturbance frequency components that are subjected to suppression and estimation for errors of the system identification model are present at the same time, a suitable correspondence about them is possible.

A periodicity disturbance suppression device as defined in Claim 8 is characterized by having:

a periodicity disturbance suppression means that has at an upstream part thereof a controller that issues a control command value, and a periodicity disturbance observer portion by which a frequency component of a periodicity disturbance of a suppression-controlled object, which is output of a controlled-object that produces the periodicity disturbance, is multiplied by a reversed system that is expressed by a reciprocal of a system identification model thereby to estimate a periodicity disturbance, the periodicity disturbance estimated by the periodicity disturbance observer portion being, as a compensation command value, subtracted from the above-mentioned control command value thereby to suppress the periodicity disturbance;

a phase calculation means that calculates a vector rotation angle that extends from a detected position before one period to a detected present position, as a phase error caused by an error of the system identification model, the vector rotation angle being defined with respect to a vector in which a vector trajectory drawn on a complex vector plane by each frequency component of the periodicity disturbance during the periodicity disturbance suppression control carried out by the periodicity disturbance suppression means shifts from the detected current position to an original position;

a gain calculation means that calculates a gain error by the error of the system identification model in accordance with a current value of the gain of a vector trajectory and a desired value of the gain of the vector trajectory, the vector trajectory being drawn on a complex vector plane by each frequency component of the periodicity disturbance during the periodicity disturbance suppression control carried out by the periodicity disturbance suppression means; and a correction command value calculation means that calculates a rotating vector, which is derived by multiplying together the phase error calculated by the phase calculation means and the gain error calculated by the gain calculation means, as a correction command value to the system identification model, wherein the system identification model is corrected by the correction command value calculated by the correction command value calculation means.

A periodicity disturbance suppression method as defined in Claim 14 is characterized by having:

a periodicity disturbance suppression step that has at an upstream part thereof a controller that issues a control command value, and a periodicity disturbance observer portion by which a frequency component of a periodicity disturbance of a suppression-controlled object, which is output of a controlled-object that produces the periodicity disturbance, is multiplied by a reversed system that is expressed by a reciprocal of a system identification model thereby to estimate a periodicity disturbance, the periodicity disturbance estimated by the periodicity disturbance observer portion being, as a compensation command value, subtracted from the above-mentioned control command value thereby to suppress the periodicity disturbance;

a phase calculation step that calculates a vector rotation angle that extends from a detected position before one period to a detected present position, as a phase error caused by an error of the system identification model, the vector rotation angle being defined with respect to a vector in which a vector trajectory drawn on a complex vector plane by each frequency component of the periodicity disturbance during the periodicity disturbance suppression control carried out by the periodicity disturbance suppression means shifts from the detected current position to an original position;

a gain calculation step that calculates a gain error by the error of the system identification model in accordance with a current value of the gain of a vector trajectory and a desired value of the gain of the vector trajectory, the vector trajectory being drawn on a complex vector plane by each frequency component of the periodicity disturbance during the periodicity disturbance suppression control carried out by the periodicity disturbance suppression means;

a correction command value calculation step that calculates a rotating vector, which is derived by multiplying together the phase error calculated by the phase calculation means and the gain error calculated by the gain calculation means, as a correction commend value to the system identification model; and a step that corrects the system identification model by the calculated correction command value.

With the above-mentioned characterization, the error of the system identification model can be corrected, and thus, ideal suppression control can be carried out due to the work of the exactly set identification model.

A periodicity disturbance suppression device as defined in Claim 9 is characterized in that the phase calculation means derives the rotation angle by adding a rotation angle that extends from a detected position of the vector trajectory before one period with respect to a vector viewed from the detected position before one period to a detected present position to another rotation angle that extends from the detected present position to an original position with respect to a vector viewed from the detected position before one period to the detected present position.

With the above-mentioned characterization, since the phase error caused by an error of a system identification model is calculated by taking into account the past condition as well as the present condition, correction accuracy can be increased.

A periodicity disturbance suppression device as defined in Claim 10 is characterized in that the phase calculation means calculates the phase error by passing a difference between the rotation angle and a desired rotation angle through a PI controller and the gain calculation means calculates the gain error by passing a difference between the present value of the gain and a desired value through the PI controller.

With the above-mentioned characterization, followability of the vector trajectory can be increased.

A periodicity disturbance suppression device as defined in Claim 11 is characterized in that the phase calculation means, the gain calculation means and the correction command value calculation means are provided by a number of the order of the frequency component of the periodicity disturbance and a correction command value of the frequency component of each order is derived for correcting the system identification model.

With the above-mentioned characterization, a periodicity disturbance for plural orders is possible even when a plurality of frequency components of the periodicity disturbance, which are for suppressing or correcting the system identification model, are present at the same time.

Advantages of Invention (1) According to the invention of Claims 1 to 7, an error of a system identification model used for a periodicity disturbance observer can be suitably corrected, and thus, robustness against the errors of the identification model can be increased.

(2) According to the invention of Claim 4, learning (memorization) of a correction value to an error of an identification model of a given frequency is possible, and thus, a learning time until completion of the correction during repeated operation with the identical frequency can be shortened or no learning may be needed.

(3) According to the invention of Claim 5, even when the system identification contains an error, a suppression control can be established by the model correction function and at the same time updated identification model can be obtained.

(4) According to the invention of Claim 6, by exerting the result of a learning effected in a specific frequency on a surrounding frequency, stabilizing of a suppression control and shortening of time needed for learning are possible even when the frequency fluctuates.

(5) According to the invention of Claim 7 or 11, even when suppression and estimation of an error of system identification model and frequency components of periodicity disturbance are present at the same time, suitable measures can be easily taken.

(6) According to the invention of Claim 8, 9, 10, 11 or 14, an error of system identification model can be corrected, and thus, an appropriate suppression control can be made with the exact identification model.

(7) According to the invention of Claim 9, since the phase error caused by the system identification model error is calculated with the aid of present condition as well as a past condition, correction accuracy can be increased.

(8) According to the invention of Claim 10, followability of the vector trajectory to a desired value can be increased.

BRIEF DESCRIPTION OF DRAWINGS

FIGS. 5(a) and 5(b) show examples of the vector plane trajectory, in which FIG. 5(a) is a graph of a vector trajectory that is provided when no error is possessed by the system identification model, and FIG. 5(b) is a graph of a vector trajectory that is provided when an error is possessed by the system identification model.

FIGS. 6(a) and 6(b) show graphs of a system identification that are provided in the second embodiment under simulation.

FIGS. 7(a), 7(b) and 7(c) show graphs depicting the results of the simulation in the second embodiment that has no learning function.

FIGS. 8(a), 8(b) and 8(c) show graphs depicting the results of the simulation in the second embodiment that has a learning function.

FIGS. 9(a), 9(b) and 9(c) show graphs depicting the results of the simulation in a modified model of the second embodiment.

EMBODIMENTS OF INVENTION

In the following, embodiments of the present invention will be described with reference to the attached drawings. It is however to be noted that the present invention is not limited to the embodiments described hereinafter. In the embodiments, a system identification model error (viz., error of a system identification model) is learned and the learned error is corrected. In the following embodiments, there are cases that a torque ripple control is explained as an example for controlling the motor. However, the present invention is not limited to such control.

First Embodiment

First, as an output that is to be controlled, attention will be paid to a trajectory of each frequency component of, for example, a torque ripple drawn on a complex vector plane that shows on the real axis n-order torque pulsation extracted component (cosine coefficient) $T_{An}$ and on the imaginary axis n-order torque pulsation extracted component (sine coefficient) $T_{Bn}$.

Figure 4:
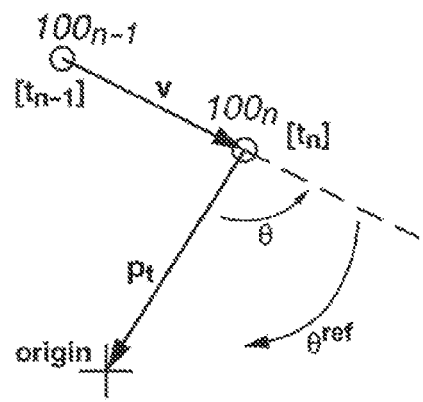
FIG. 4 is a diagram showing a complex vector plane trajectory used in the present invention, which explains a phase error caused by a system identification model error.

FIG. 4 is a diagram showing a complex vector plane trajectory. Denoted by $100_n$ shows a position (viz., detected present position) that appears when the time elapses by a time [$t=t_n$] from starting of the suppression, and denoted by $100_{n-1}$ shows a position (viz., position detected before one period) that appears when the time elapses by a time [$t=t_{n-1}$] from starting of the suppression.

Figure 5A:
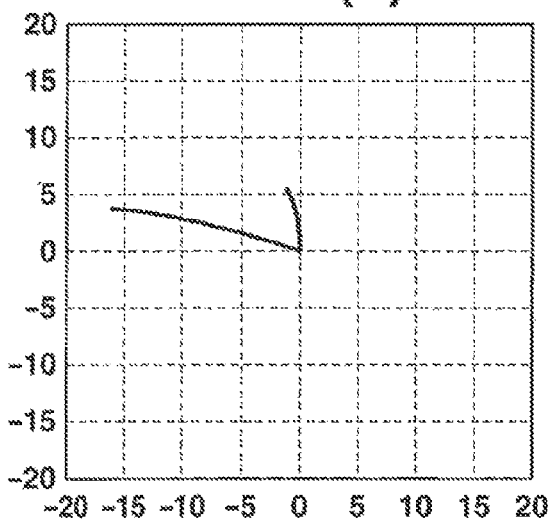

If the system identification model has no error to a real value, the vector trajectory extends from the control start point to an origin where, as is seen from for example FIG. 5(a) that shows a vector plane trajectory, there is no torque ripple (periodicity disturbance). That is, the vector trajectory is straightly directed to the origin in an optimum response time. As is seen from FIG. 5(b), if the system identification model has an error to the real value, the vector trajectory is forced to draw a curve or circular orbit, and in the worst case, the vector trajectory is directed in an infinity direction.

This embodiment presupposes to cancel the torque ripple (periodicity disturbance $d_n$ shown in FIG. 13) by setting the n-order compensation current command value 0 (zero). However, in case where the command value is set to a value other than 0 (zero), the position of the compensation current value shown in the vector plane corresponds to the origin.

In the present invention, during the suppression control, a rotational vector $P_n^{ref}$ including a gain $G^{ref}$ and a phase $\theta^{ref}$ in the following equation (2) is successively determined from the above-mentioned information on the trajectory, and as is seen from equation (3), by multiplying the rotational vector and the identification model $P^{\wedge}_n$, the identification model is corrected to obtain an updated identification model $P'_n$. The updated identification model $P'_n$ is applied to a reversed system identification model used in the a periodicity disturbance observer PDO.

$$P_n^{ref} = G^{ref} \cdot (\cos \theta^{ref} + j \sin \theta^{ref}) \qquad (2)$$

$$P'_n = P^{\wedge}_n \cdot P_n^{ref} \qquad (3)$$

Figure 1:
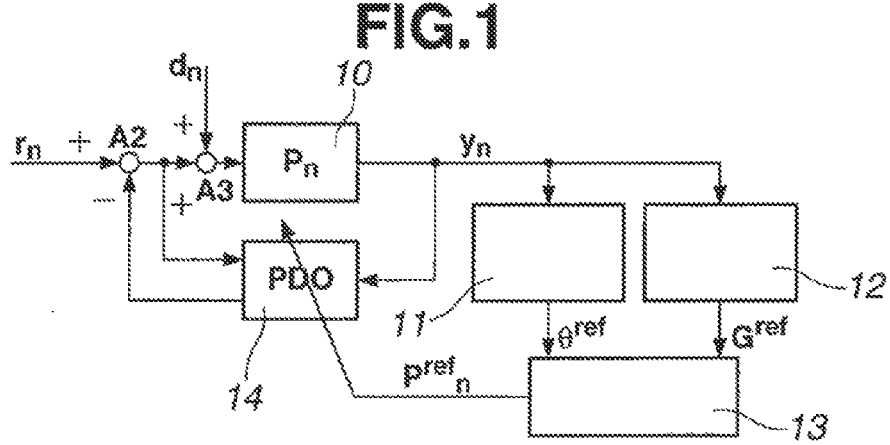
FIG. 1 is a block diagram of an identification model correction portion of a first embodiment.
Figure 19:
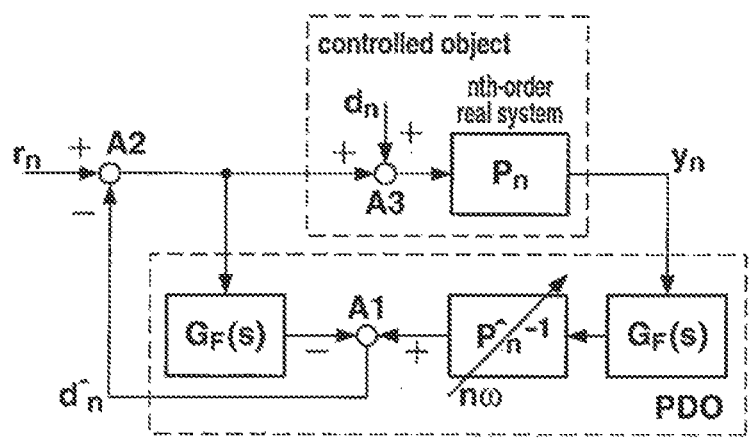
FIG. 19 is a block diagram of a periodicity disturbance observer controller.

FIG. 1 shows a block diagram depicting a correcting portion of an identification model of the first embodiment that embodies the equations (2) and (3). FIG. 1 shows a part of FIG. 19 in a simple manner, which relates to a frequency component, and portions in FIG. 1 that are the same as those of FIG. 19 are denoted by the same numerals.

In the block diagram of the correcting portion of the system identification model, denoted by 10 is a real plant, 11 is a phase correction amount calculation portion as a phase correction amount calculation means of the present invention which calculates, from an output $y_n$ of a controlled object of the plant 10, a phase (rotation angle) $\theta$ of a vector trajectory drawn by each frequency component of the periodicity disturbance, and as will be described hereinafter, calculates a correction amount $\theta^{ref}$.

Figure 2:
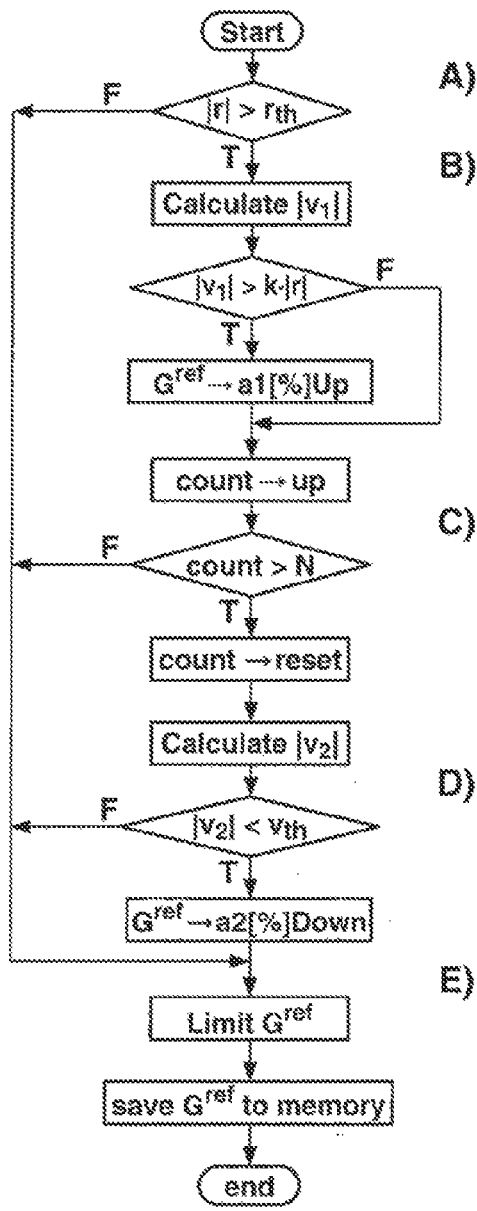
FIG. 2 is a flowchart for deciding a gain correction time in the first embodiment.

Denoted by 12 is a gain correction amount calculation portion as a gain correction amount calculation means of the present invention which calculates, from the output $y_n$ of the controlled object, an advance peed (viz., current value of gain) |v| of the vector trajectory drawn by each frequency component of the periodicity disturbance, and corrects the progress speed based on the flowchart of FIG. 2.

Figure 13:
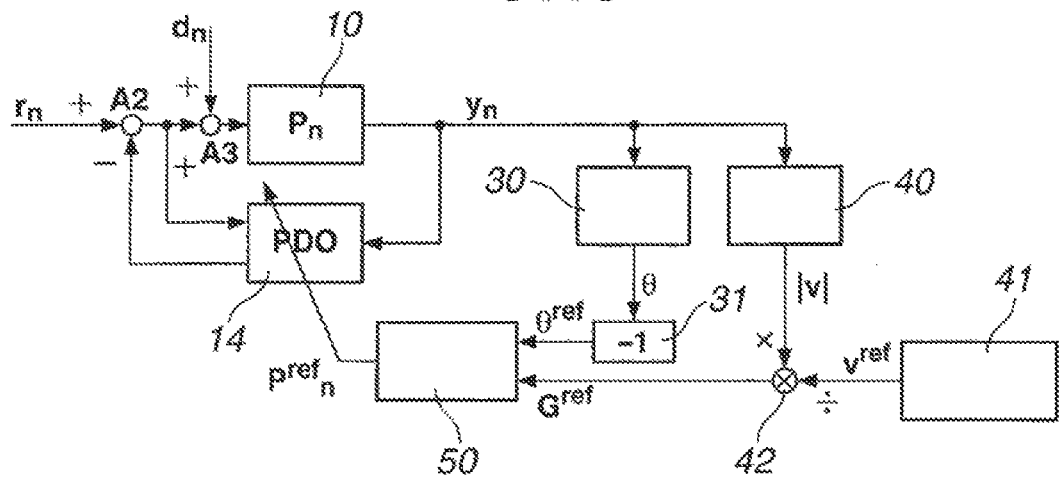
FIG. 13 is a control block diagram of a system identification model corrector used in a sixth embodiment.

Denoted by 13 is a rotational vector calculation portion as a rotational vector calculation means of the present invention, which calculates, based on the equation (2), a rotational vector $P_n^{ref}$ (correction command value to the system identification model) by multiplying the $\theta^{ref}$ and the gain $\theta^{ref}$, and corrects the system identification model of the periodicity disturbance observer portion 14 by the rotational vector $P_n^{ref}$. Into the periodicity disturbance observer portion 14, there are inputted both the output $y_n$ of the controlled object and the control command, and a calculation depicted by the block diagram of FIG. 13 is carried out to derive a periodicity disturbance estimated value $d\hat{}_n$, and the periodicity disturbance estimated value $d\hat{}_n$ is subtracted from the control command $r_n$ at the adder A2 for suppressing the periodicity disturbance $d_n$ that is added at the adder A3.

The phase correction amount $\theta^{ref}$ based on the equation (2) is determined in the following manner.

As is shown in FIG. 4, a vector directed toward the origin and placed at a position $(T_{An}, T_{Bn})$ determined after an elapsed time $[t=t_n]$ from the control start time will be put as $P_t$, and a vector from a time $[t=t_{n-1}]$ to a time $[t=t_n]$ will be put as v. A rotation angle of v viewed from $P_t$ will be put as $\theta^{ref}$. If no model error is present, $\theta$ is always 0 (zero). When the phase correction amount $\theta^{ref}$ is reversed to a detected phase $\theta$, the error of the system identification model can be corrected.

$$\theta = \tan^{-1}(P_t \times v / P_t \cdot v) \quad (4)$$

In the equation (4), [×] means outer product and [·] means inner product.

If the model error is small to such a degree that the suppression can be made without the aid of the correction, the periodicity disturbance observer portion produces a compensation command in the direction of $\theta=0$. If any model error is present, the correction amount is determined considering that the value $\theta$ is similar to a phase error of the identification model. In order to reduce the effect that is caused by the similarity to the phase error, the phase correction amount calculation portion 11 of the present invention derives $\theta^{ref}$ by adding the previous phase correction amount $\theta^{ref}_{n-1}$ to the product of weight a and the rotation angle $\theta$, as is shown by the equation (5).

It is to be noted that an initial value of the phase correction amount $\theta^{ref}_n$ is 0 (zero). With this process, the value $\theta^{ref}$ can be suitably adjusted even when a change happens suddenly, and thus, a flexible approach is expected, and thus the model can be corrected in a direction to make $\theta$ zero.

$$\theta^{ref}_n = \theta^{ref}_{n-1} - a \cdot \theta \quad (5)$$

The gain correction amount calculation portion 12 determines a corrected gain $G^{ref}$ based on the flowchart of FIG. 2. Even when the phase error is small, vibratory actions using a target point as a center and a very long convergence time tend to appear if the gain error is large. By carrying out the gain correction as well as the phase correction, a highly robust correction control to the model error can be established.

The corrected gain $G^{ref}$ is determined from the position vector $P_t$ and the speed vector v of FIG. 4 with the aid of the flowchart of FIG. 2 that determines the corrected gain. The steps from Start to End of FIG. 2 are periodically repeated in parallel with the suppression control, so that the gain correction amounts are determined one after another. Regarding the adjusting direction of the correction amounts, increase/decrease in the corrected gain $G^{ref}$ corresponds to decrease/increase in progress speed. An initial value of the corrected gain $G^{ref}$ is set to 1 (one).

In the following, treating process of (A) to (E) of FIG. 2 will be described.

(A) If an absolute value |r| of the position vector is equal to or smaller than a threshold value rth, adjustment is not carried out judging that a convergent condition has taken place.

(B) In order to prevent boisterous behavior, control of the progress speed is carried out in a relatively short cycle (for example, for each several tens of [msec]). A progress speed |v1| is calculated from a speed vector, and a judging threshold is determined to k·|r| since it is proportional to |r|. If the progress speed |v1| is equal to or higher than the threshold value, the corrected gain $G^{ref}$ is increased by a1 [%] judging that there is a shortage of gain. It is to be noted that a1 and k are parameters that can be set at will.

(C) A cycle period of the correction control is divided into N period sections, and the progress speed |v2| is calculated in this divided cycle period (for example, for each several [sec]).

(D) If |v2| is equal to or lower than a threshold value vth, the corrected gain $G^{ref}$ is decreased by a2 [%] judging that there is a too much gain. With this, a delayed convergence condition is suppressed, and the progress speed is increased. It is to be noted that vth and a2 are parameters that can be set at will.

(E) The corrected gain $G^{ref}$ is finally limited and the final value is stored in a memory.

As is described hereinabove, with usage of the vector trajectory of $(Y_{AN}, Y_{BN})$ and the above-mentioned phase and gain correction method, an identification model is corrected by using the equation (3).

Accordingly, in this embodiment, an error of system identification model used in a periodicity disturbance observer can be suitably corrected, and thus, robustness to the system identification model error can be increased.

Second Embodiment

In the above-mentioned first embodiment, there is provided a means that suitably corrects, in a given frequency, a system identification model of the periodicity disturbance observer portion. While, in the second embodiment, there is provided a learning (memory) function by providing a memory that is used for memorizing the finally derived corrected value $P_n^{ref}$.

Figure 3:
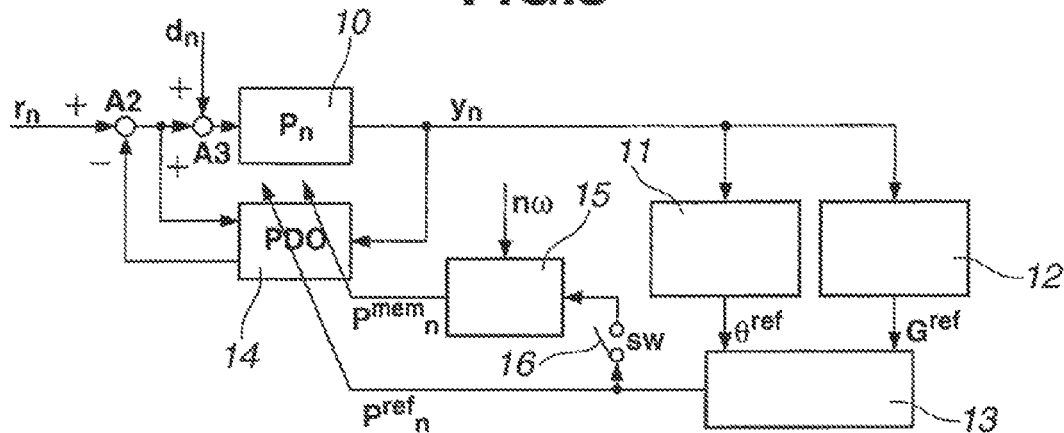
FIG. 3 is a block diagram of an identification model correction portion of a second embodiment.

FIG. 3 shows a block diagram of an identification model correction portion that has the learning function. Denoted by 15 is a memory that inputs through a switch 16 an output $P_n^{ref}$ of a rotation vector calculation portion 13 and at the same time inputs an angular velocity nω of PM motor. It is to be noted that the memory 15 and the switch 16 constitute a learning function portion.

The switch 16 effects ON/OFF operation at such a timing that the finally corrected rotation vector $P_n^{ref}$ is received and stored in the memory 15, and the storing timing for the rotation vector is a timing or time when the periodicity disturbance has been sufficiently suppressed due to the correction process applied to the identification model. By storing the rotation vector $P_n^{ref}$ in the memory 15 at such timing, an output is applied to the periodicity disturbance observer portion 14 changing $P_n^{ref}$ to $P_n^{mem}$. As is indicated by the following equation (6) that may be similar to the equation (3), in the periodicity disturbance observer 14, a multiplication of $P_n^{mem}$ is carried out for deriving a corrected identification model $P_n'$.

$$P'_n = P\hat{}_n \cdot P^{ref}_n \cdot P^{mem}_n \quad (6)$$

FIGS. 6 to 9 show results of two test simulations, one being a test simulation of the present embodiment using the learning function and the other being a test simulation using no learning function. In the test simulations, the rotation speed and the torque were kept under fixed conditions (42[Hz]), (the number of poles=4), (30 [Nm]), and the corrected cycle period was 20 [ms]. For a condition of torque ripple, certain amounts of ripple were applied to an electric frequency 1 and primary and secondary frequency components (1f, 2f). In FIGS. 6(a) and 6(b) respectively showing a gain and a phase (viz., simulation system identification illustration), denoted by line-a is a nominal model, denoted by line-b is a fluctuation model 1 and denoted by line-c is a fluctuation model 2.

For error condition of the system identification model, the model shown in FIGS. 6(a) and 6(b) was set to a reversed nominal identification model and an error setting was made by putting a real plant as the fluctuation model 1 before the test simulations were carried out. FIGS. 7(a), 7(b) and 7(c) show a case wherein the learning function was disabled, and FIGS. 8(a), 8(b) and 8(c) show a case wherein the learning function was enabled. In the drawings, the drawings with annex mark (a) show each a vector trajectory in case wherein the learning function was disabled, the drawings with annex mark (b) show each a relation between a distance |r| from an origin ($T_{an}$), ($T_{bn}$) and a time, and the drawings with annex mark (c) show each a relation between a shaft torque and a time.

As will be understood from the FIGS. 8(a) and 8(b), in the nominal identification model, control for the phase error and the speed directed in a diverging direction starts just after the suppression control, and thus, also in the cases 1f and 2f, suppression of the torque ripple was carried out without divergence of the suppression control.

FIGS. 9(a), 9(b) and 9(c) show verification results of a system break and a disturbance fluctuation. For the verification, the fluctuation model 2 was subjected to a system break under a condition wherein a suppression was completed in the fluctuation model 1 depicted by FIGS. 6(a) and 6(b), and at the same time, the torque ripple was doubled. As is seen from graphs of FIGS. 9(a), 9(b) and 9(c), the identification model exhibited a suitable correction against the system break and disturbance fluctuation and diverging action was suppressed, so that suppression of the torque ripple was realized.

Accordingly, according to this embodiment, learning (or memorization) of a correction amount to an identification model error at a certain frequency is enabled in addition to the effect of the first embodiment, so that a learning period until complement of the correction under repeated operation at the same frequency can be shortened or in an extreme case, the learning could become unnecessary.

Third Embodiment

For learning a correction amount of the identification model of FIG. 3, the correction amount is stored in a memory (learning function portion). The learning operation is carried out throughout all range for which the device works or in a given range repeating the learning operation while changing the operation point. However, during such learning operation, a mis-learning tends to occur.

In the third embodiment, a suppression control is turned ON/OFF in order to suppress the mis-learning that would occur when the operation point is moving.

Figure 10:
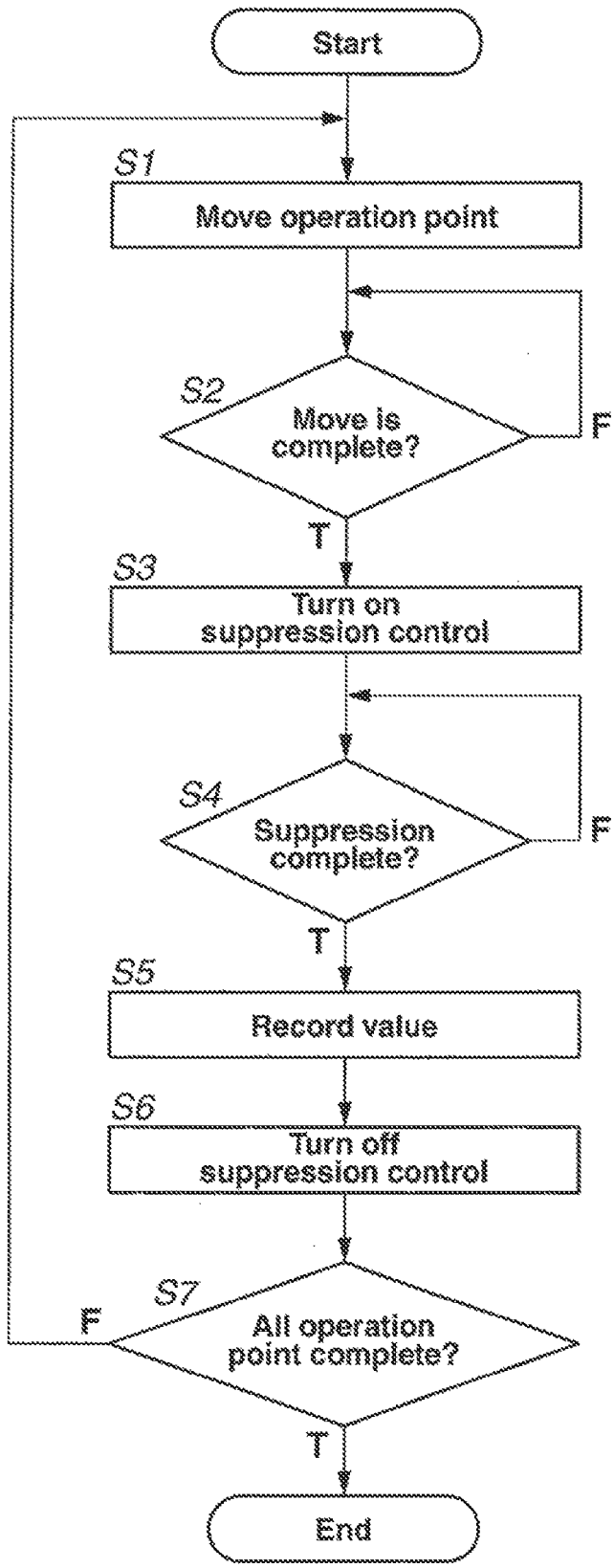
FIG. 10 is a flowchart used in the process for suppressing an incorrect learning in a third embodiment.

FIG. 10 shows a process sequence that is carried out by an identification model correction function portion provided by the above-mentioned learning function portion. At step S1, the operation point is moved, and at step S2, judgment is carried out as to whether the movement has been completed or not. If the movement has been completed, the suppression control is started at step S3. At step S4, judgment is carried out as to whether the suppression control has been completed or not, and if the suppression control has been completed, memorization is made at step S5, and at step S6, the suppression control is turned OFF. Finally, at step S7, judgment is carried out as to whether movement of all operation points has been completed or not. This judgment is continued until the judgment of completion, so that the identification model for all corrected frequency range is completed. In case of carrying out the process sequence with a given operation point, intermittent points are derived by employing any method.

With this, even if the system identification contains an error, the suppression control can be completed by the model correction function and at the same time a new identification model can be obtained.

Fourth Embodiment

Figure 11:
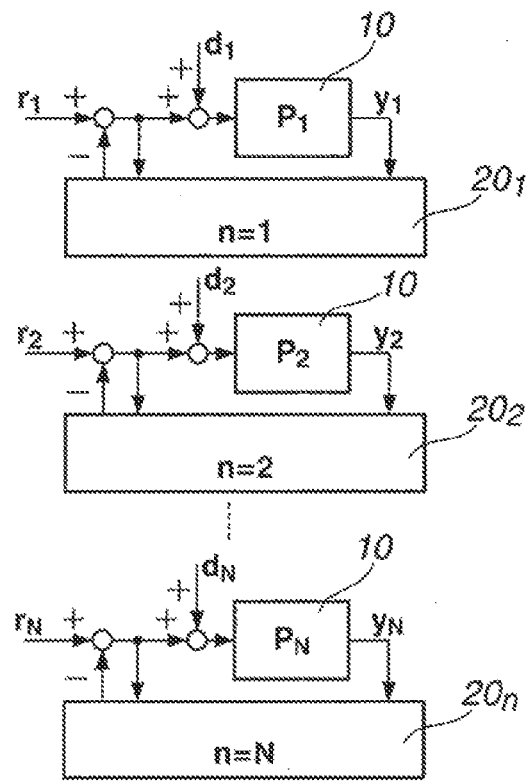
FIG. 11 shows block diagrams that are employed in a fourth embodiment at the time when plural orders are detected at the same time.

In the above-mentioned embodiments, correction is made possible by estimating an identification model error of a specified frequency component. In this fourth embodiment, as is seen from FIG. 11, there are provided the "n" number (order-n of frequency component of periodicity disturbance) of observer portions $20_1$ to $20_N$ each having identification model correction means, so that estimation and correction of the identification model error, such as those made in the control systems of FIGS. 1 and 3, are carried out in parallel for each order.

The observer portions $20_1$ to $20_N$ having respective identification model correction means have each various functioning portions, such as the periodicity disturbance observer portion 14, phase correction amount calculation portion 11, gain correction amount calculation portion 12 and rotation vector calculation portion 13, which are all shown in FIGS. 1 and 3, and estimate identification model errors against the n-order control commands $r_1$ to $r_N$ and output periodicity disturbance estimated values $\hat{d}_1$ to $\hat{d}_N$ which are the results of the error correction of the system identification model.

According to this embodiment, in addition to the advantages obtained in the above-mentioned first and second embodiments, there is further obtained an advantage in which even when the periodicity disturbance frequency component that is to be suppressed and used for estimating the system identification model error has more than one at the same time, a suitable counter-action can be carried out.

Fifth Embodiment

Although the above-mentioned second to fourth embodiments have the learning function added thereto, the learning point is directed to only one point frequency.

Figure 12A:
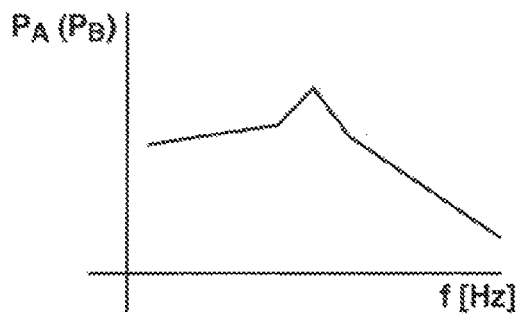
FIGS. 12(a), 12(b) and 12(c) show graphs used for explaining an interpolation process used in a fifth embodiment.
Figure 12B:
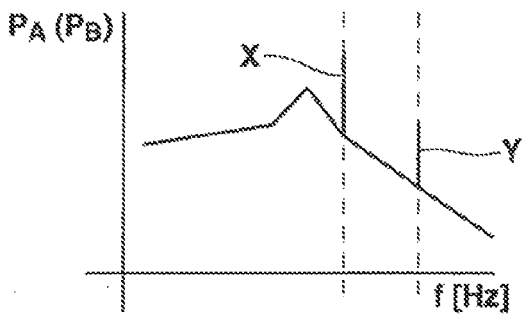

That is, in frequency response graphs of FIG. 12 each depicting a relation of $P_A(P_B)$, in which FIG. 12(a) is a frequency response graph of the relation of $P_A(P_B)$ depicting a system identification model in an initial condition. In the above-mentioned embodiments, the results of learning the identification model error are so made that as is depicted by FIG. 12(b), the suppression control of the periodicity disturbance is directed to only a specified frequency point "x" or point "y" that is provided by fluctuation of the model, and thus, the point that is able to learn the model error is directed to only a specified frequency. Accordingly, if the point is shifted from the learned frequency by only a small frequency, a learning result obtained by a frequency just close to the frequency can not be practically used. If the controlled object is a speed variable device, such as a motor or the like, relearning is required even if the frequency fluctuation is very fine.

Figure 12C:
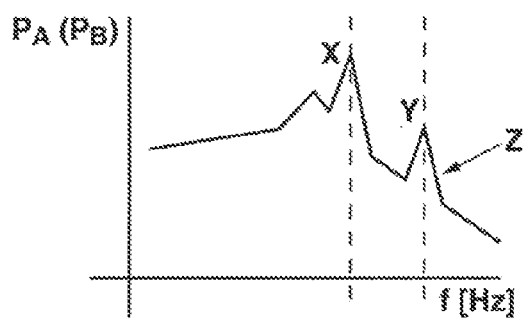

Accordingly, in the fifth embodiment, the above-mentioned learning function portion is provided with an interpolation correction means, and as is depicted by FIG. 12(c), an interpolation process is applied to frequency zones of learning points "x" and "y" by the interpolation correction means, so that as is seen from the interpolation zone "z", a certain frequency range can be obtained relative to the pin point.

Accordingly, in this embodiment, by affecting the learning results obtained at a specified frequency to the surrounding frequencies, stability of suppression control and reduction of time needed for learning against the fluctuation of frequency can be achieved.

Sixth Embodiment

Denoted by numeral 30 in FIG. 13 is a rotation angle calculation portion that calculates a phase (rotation angle) θ of a vector trajectory that is drawn by each frequency component of the periodicity disturbance based on an output $y_n$ of the controlled object, denoted by numeral 31 is a sign inversion device that derives a phase $\theta^{ref}$ (phase error caused by the system identification model error) by inverting the above-mentioned phase θ. The rotation angle calculation portion 30 and the sign inversion device 31 constitute a phase calculation means of the present invention.

Denoted by numeral 40 is a current speed calculation portion that calculates a current speed (current value of gain) |v| of a vector trajectory that is drawn by each frequency component of the periodicity disturbance based on an output $y_n$ of the controlled object, denoted by numeral 41 is a desired speed calculation device that determines a desired speed $v^{ref}$, denoted by numeral 42 is a calculation device that calculates the grain $G^{ref}$ (=|v|/$v^{ref}$: gain error caused by the system identification model error) based on a ratio between the above-mentioned |v| and $v^{ref}$. The current speed calculation portion 40, the desired speed calculation device 41 and the calculation device 42 constitute a gain calculation means of the present invention.

Denoted by numeral 50 is a rotation vector calculation portion that calculates a rotation vector $P^{ref}$ by multiplying the above-mentioned phase $\theta^{ref}$ and gain $G^{ref}$ together, for the purpose of correcting the system identification model of the periodicity disturbance observer PDO by using the rotation vector $P^{ref}$. This rotation vector calculation portion constitutes a correction command value calculation means of the present invention.

The phase $\theta^{ref}$ will be understood from FIG. 4. That is, in the drawing, a vector of a position $100_n$ ($T_{An}$, $T_{Bn}$) in the origin direction, that is provided when a time [t=$t_n$] elapses from starting of the suppress control, is denoted by $P_t$, and a vector to from a position $100_{n-1}$ provided at a time [t=$t_{n-1}$] to the position $100_n$ provided at the time [t=$t_n$] is denoted by v. The rotation angle of v taken when viewed from $P_t$ is denoted by θ, and this rotation angle is regarded as a phase error approximately from a real value of the system identification model. In view of this, the angle $\theta^{ref}$ to be corrected at time [t=$t_n$] is derived by using equation (7).

[Expression-1]

$$\theta^{ref} = -\theta = -\tan^{-1}(P_t \times v)/(P_t \cdot v) \tag{7}$$

In the equation (7), [×] means outer product and [·] means inner product.

For deriving $G^{ref}$, a desired speed $v^{ref}$ is determined by a desired speed calculation device 21 based on the size of $P_t$ (distance from the origin) and by using a calculator 22, the value $G^{ref}$ is derived from equation (8) as a rate relative to the current speed |v|.

[Expression-2]

$$G^{ref} = |v|/v^{ref} \tag{8}$$

This value will be regarded as a gain error caused by the system identification model error.

In the present invention, once a desired speed $v^{ref}$ is determined, the system identification model is corrected based on the determined desired speed, and thus a desired response can be obtained. Regarding the desired speed, that is, a response speed of the suppression control or shape of the response wave, they aren't always set to ideal values because of difficulty with which the control is applied. However, even in such cases, satisfaction for the desired response can be obtained by determining a desired speed that fulfills the desire.

Figure 5B:
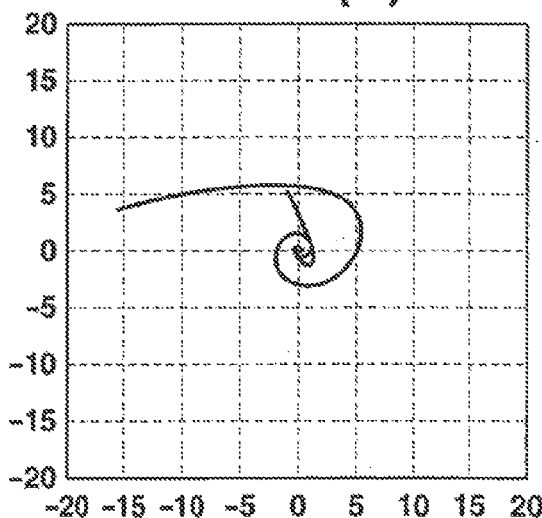
Figure 14:
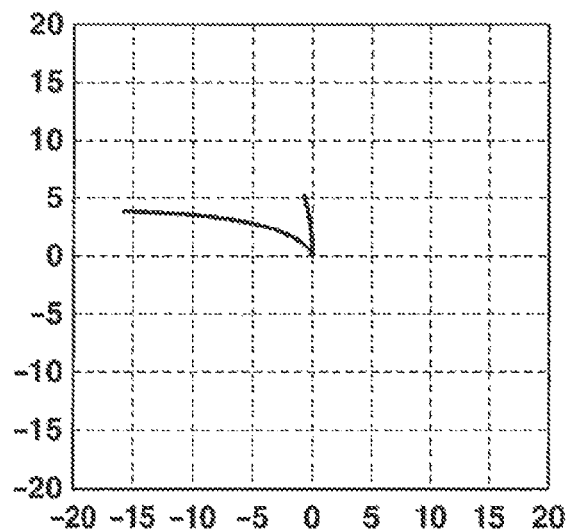
FIG. 14 is a graph showing a vector trajectory that appears when the present invention is applied to a system identification model with an error.

A result of a simulation in which the present invention was applied to the condition of FIG. 5(b) that has an error is shown in FIG. 14. Before application of the present invention, the trajectory was a curved line as shown in FIG. 5(b). However, after the application of the invention, the trajectory became almost straightened, which proved the effect of the present invention.

Seventh Embodiment

Figure 15:
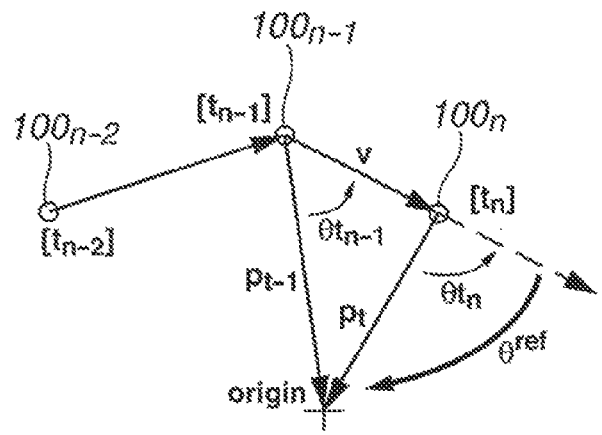
FIG. 15 is a view showing a complex vector plane trajectory used for explaining a principle of a seventh embodiment of the invention.

This seventh embodiment is constructed by providing the sixth embodiment with an improvement in accuracy of the angle correction. A vector trajectory provided by expanding the trajectory on a complex vector plane of FIG. 5 to a position $100_{n-2}$ (viz., the position detected before two cycle periods) taken at the time [t=$t_{n-2}$] is shown by FIG. 15. In FIG. 15, an angular error at a position $100n$ taken at the time [t=$t_n$] is denoted by $\theta_{tn}$. In the above-mentioned sixth embodiment, the $\theta_{tn}$ is regarded approximately as a phase error relative to a real value of the identification model. More specifically, since the movement direction is decided by the periodicity disturbance observer, there is such a possibility that at the position (viz., the position detected after one cycle period) taken at the time [t=$t_{n+1}$], the movement direction shows a larger or smaller value relative to a movement direction that has been corrected by $\theta^{ref}$. Furthermore, it tends occur that other errors are produced due to the correction.

In view of the above, in the seventh embodiment, the correction accuracy is increased by practically using past information.

In FIG. 15, the rotation angle $\theta t_{n-1}$ of vector v taken when viewed from vector $P_{t-1}$ of the position $100_{n-1}$ in the origin direction taken at the time [t=$t_{n-1}$] is calculated like the above-mentioned equation (7). The rotation angle thus calculated can be regarded as an error for the correction of the position $100_{n-1}$ taken at the time [t=$t_{n-1}$] relative to a direction in which the movement is actually made. In view of this, the angle $\theta^{ref}$ to be corrected at position $100_n$ taken at the time [t=$t_n$] is calculated from equation (9) that shows the sum of rotation angle $\theta_{tn}$ and rotation angle $\theta_{tn-1}$.

[Expression-3]

$$\begin{aligned}\theta^{ref} &= -(\theta t_n + \theta t_{n-1}) \\ &= -\{\tan^{-1}(P_t \times v)/(P_t \cdot v) + \tan^{-1}(P_{t-1} \times v)/(P_{t-1} \cdot v)\}\end{aligned} \tag{9}$$

Thus, a different point of the seventh embodiment relative to the above-mentioned sixth embodiment is that the rotation angle calculation portion 10 calculates $\theta_{tn} + \theta_{tn-1}$ in place of the above-mentioned phase (rotation angle) θ, and other points are identical to those of the sixth embodiment (FIG. 13).

As is mentioned in the above, by reflecting an error produced upon correction of old data to a current correction, the correction accuracy can be increased.

Eighth Embodiment

In the above-mentioned sixth and seventh embodiments, the gain $G^{ref}$ of the rotation vector $P^{ref}_n$ and the phase $\theta^{ref}$ are uniquely determined based on current information and past information. However, the gain $G^{ref}$ and the phase $\theta^{ref}$ can be determined by using a control device of FIG. 16 (61, 62).

That is, like in the sixth embodiment, a desired angle against the phase (rotation angle) θ and the gain v of the vector trajectory is set by a desired angle calculation device 63, and a desired speed is set by a desired speed calculation device 64. The desired speed is the same as that mentioned in the sixth embodiment and the desired angle is basically 0 (zero).

A difference between the desired angle calculated by to the desired angle calculation device 63 and the current angle θ calculated by the rotation angle calculation portion 30 is derived by an adder 65, and the derived difference is inputted to a PI controller 61, and a difference between the desired speed calculated by the desired speed calculation device 64 and the current speed |v| calculated by a current speed calculation portion 40 is derived by an adder 66, and the derived difference is inputted to another PI controller 62 to calculate the phase $\theta^{ref}$ and gain $G^{ref}$ respectively.

Figure 16:
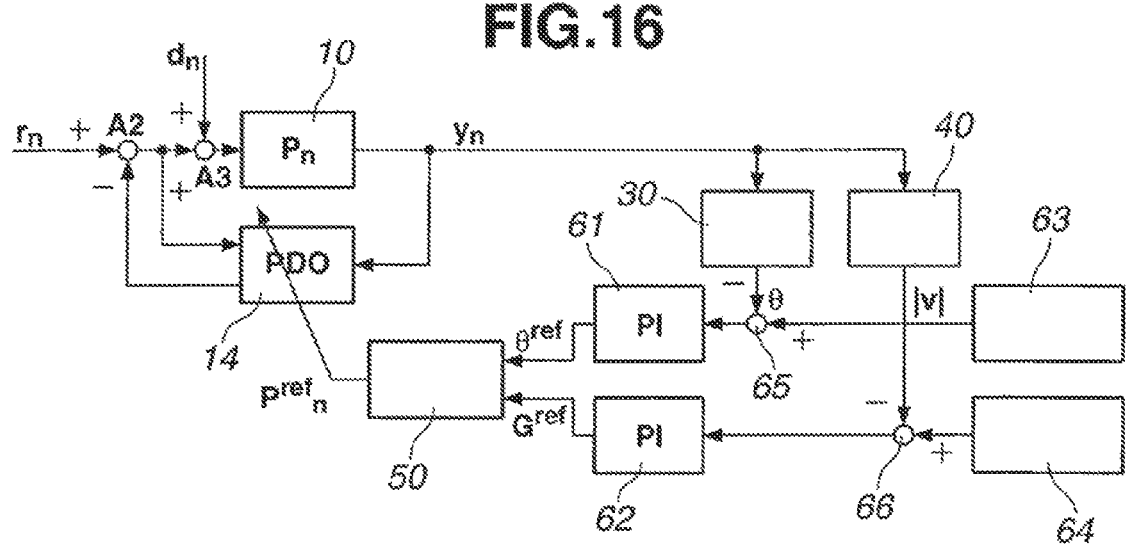
FIG. 16 is a control block diagram of a system identification model corrector used in an eighth embodiment.

It is to be noted that portions of FIG. 16 that are the same as those of FIG. 13 are indicated by the same reference numerals. The above-mentioned PI controllers 61 and 62 may be of a conventional type, and PID control is usable.

In the eighth embodiment, the phase (rotation angle) calculated by the rotation angle calculation portion 30 may be "$\theta_{tn}+\theta_{tn-1}$" mentioned in the seventh embodiment in place of θ.

With the above-mentioned arrangement, followability of the vector trajectory to a desired value is increased as compared with the above-mentioned sixth and seventh embodiments.

Ninth Embodiment

Figure 17:
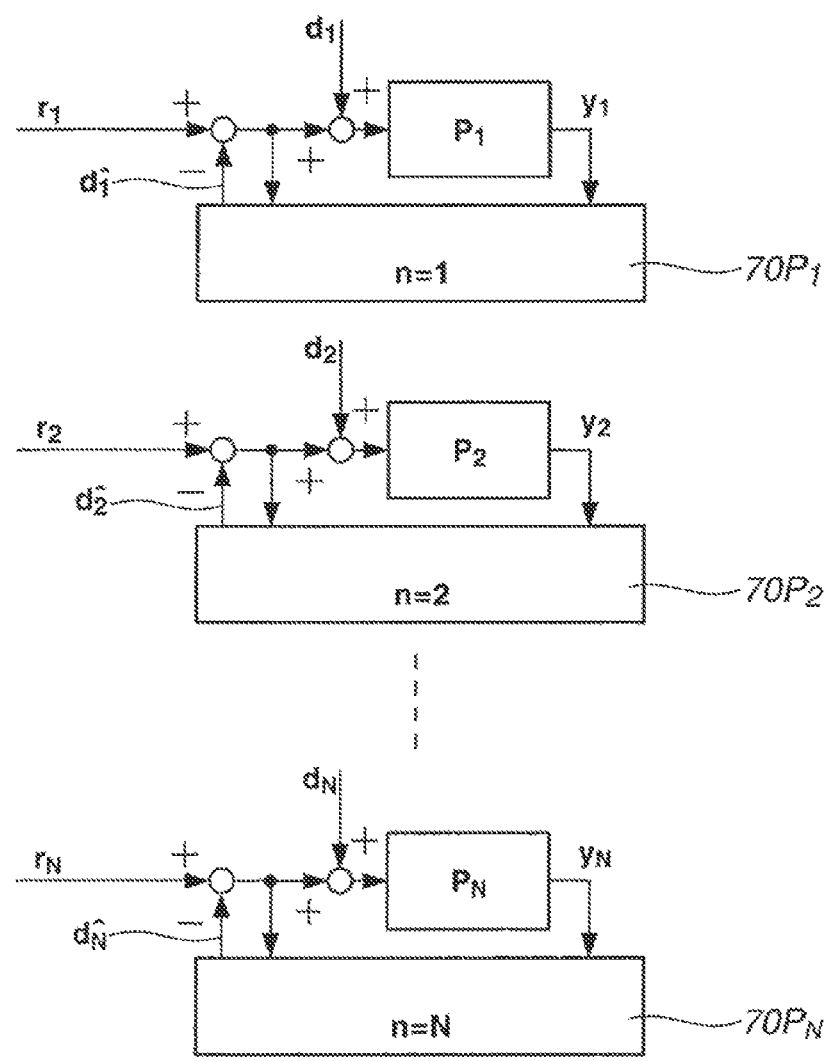
FIG. 17 shows block diagrams showing a ninth embodiment.
Figure 18:
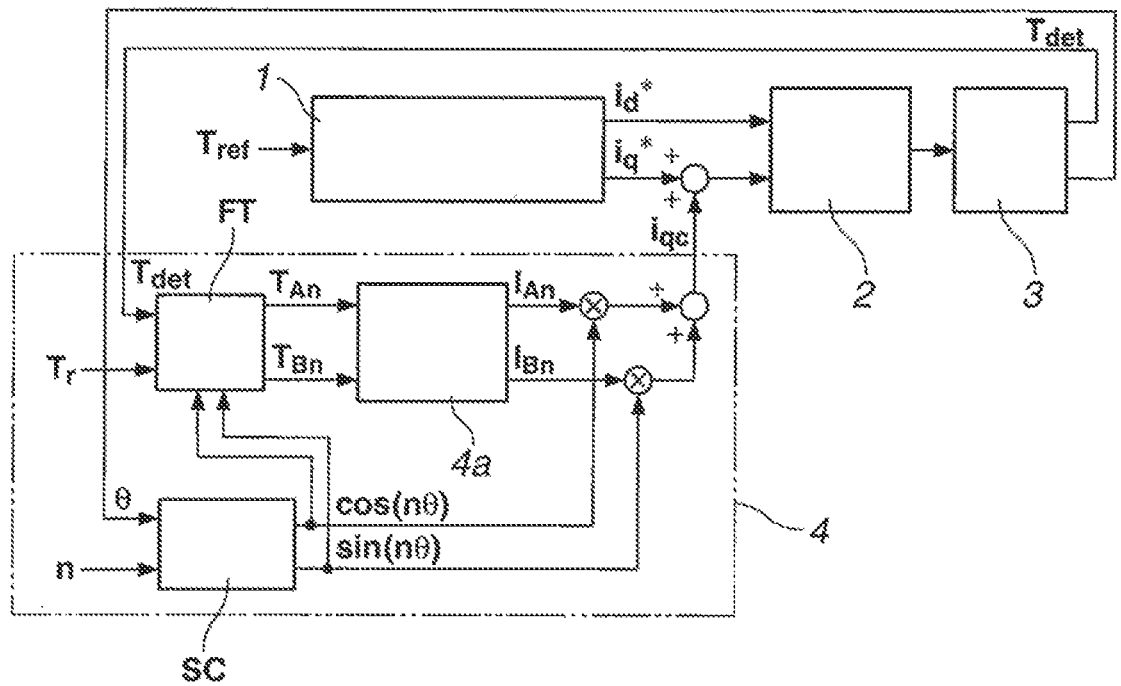
FIG. 18 is a block diagram of a conventional disturbance suppression device.

In the above-mentioned sixth, seventh and eighth embodiments, identification model error is estimated in a specified frequency component and it is mentioned that correction of the error is possible. In the ninth embodiment, as is seen from the drawings of FIG. 17, there are provided the "N" number (order-n of frequency component of periodicity disturbance) of PDOs $70P_1$ to $70P_N$ each having an identification model corrector, so that estimation and correction of the identification model error, such as those made in the control systems of FIGS. 13 and 16, are carried out in parallel for each order.

The PODs $70P_1$ to $70P_N$ each having an identification model corrector have each functions of the periodicity disturbance observer PDO 14, the rotation angle calculation portion 30, the sign inversion device 31, the current speed calculation portion 40, the desired speed calculation device 41, the calculation device 42 and the rotation vector calculation portion 50 which are shown in FIG. 13 (sixth embodiment) or have each functions of the periodicity disturbance observer 14, the rotation angle calculation portion 30, the current speed calculation portion 40, the rotation vector calculation portion 50, PI controllers 61, 62, the desired angle calculation portion 63, the desired speed calculation portion 64 and adders 65 and 66 which are shown in FIG. 16 (eighth embodiment), so that identification model errors are estimated against the n-order control commands $r_1$ to $r_N$ and periodicity disturbance estimated values $d\hat{}_1$ to $d\hat{}_N$ which are the results of correcting the system identification model based on the estimated errors are outputted respectively.

With the above-mentioned arrangement, even when the periodicity disturbance frequency component that is to be suppressed and used for estimating the system identification model error has more than one at the same time, a suitable counter-action can be carried out.

INDUSTRIAL APPLICATION

The present invention is applicable to for example a shaft torque resonance suppression of a dynamometer system, a vibration suppression of a motor housing (viz., devices for improving riding comfort of an electric motor vehicle, an elevator and the like), and other whole devices that have a problem regarding a periodicity disturbance.

EXPLANATION OF REFERENCE NUMERALS

1 . . . command value converting portion
2 . . . inverter
3 . . . PM motor
4 . . . observer portion
10 . . . real plant (controlled object)
11 . . . phase correction amount calculation portion
12 . . . gain correction amount calculation portion
13, 50 . . . rotation vector calculation portion
14 . . . periodicity disturbance observer portion
15 . . . memory
16 . . . switch
$20_1$ to $20_n$ . . . PDO with model error corrector
30 . . . rotation angle calculation portion
31 . . . sign inversion device
40 . . . current speed calculation portion
41 . . . desired speed calculation device
42 . . . calculation device
61, 62 . . . PI controller
63 . . . desired angle calculator
65, 66 . . . adder
$70P_1$ to $70P_N$ . . . PDO with identification model corrector

The invention claimed is:

1. A periodicity disturbance suppression device characterized by having:
a periodicity disturbance suppression means that has at an upstream part of a control flow a controller that inputs a control command value and a periodicity disturbance observer portion that extracts from an output of a controlled-object a frequency component corresponding to a periodicity disturbance, the extracted frequency component being multiplied by a reversed system expressed by a reciprocal of a system identification model, thereby to estimate the periodicity disturbance, the estimated periodicity disturbance being, as a compensation command value, subtracted from the above-mentioned control command value for suppressing periodicity disturbance;
a phase correction amount calculation means that derives a phase correction amount of a system model by inputting and calculating a trajectory provided when the frequency component of the periodicity disturbance obtained by the periodicity disturbance suppression means is drawn on a complex vector plane;

a gain correction amount calculation means that derives a gain correction amount of the system model by inputting and calculating the frequency component of the periodicity disturbance obtained by the periodicity disturbance suppression means; and a rotational vector calculation means that calculates a system identification model correction value by multiplying together the phase correction amount from the phase correction amount calculation means and the gain correction amount from the gain correction amount calculation means, and corrects the system identification model of the periodicity disturbance suppression means based on the system identification model correction value.

2. A periodicity disturbance suppression device as claimed in claim 1, in which a controlled object is a motor, an output from the motor is inputted to the periodicity disturbance observer portion to estimate a periodicity disturbance, the estimated periodicity disturbance from the periodicity disturbance observer portion is, as a compensation command value, subtracted from the control command value to control the motor through an inverter, wherein:

the phase correction amount calculation means calculates a phase of the vector trajectory that is drawn by the frequency component of the periodicity disturbance by inputting therein the output of the motor;

the gain correction amount calculation means inputs therein the output of the motor to calculate a progress speed of the vector trajectory drawn by the frequency component of the periodicity disturbance, and compares the progress speed with a threshold value, and repeats the calculation and comparison for plural times to calculate a gain correction amount; and the rotational vector calculation means calculates the system identification model correction value by multiplying together the phase correction amount from the phase correction amount calculation means and the gain correction amount from the gain correction amount calculation means, and corrects the system identification model of the periodicity disturbance of the periodicity disturbance observer portion based on the system identification model correction value.

3. A periodicity disturbance suppression device as claimed in claim 1, which is further characterized in that the phase correction amount $\theta^{ref}_n$ provided by the phase correction amount calculation means is derived by adding a previously calculated phase correction amount $\theta^{ref}_{n-1}$ to the product of a weight a and a rotation angle $\theta$.

4. A periodicity disturbance suppression device as claimed in claim 1, which is further characterized in that a learning function portion is provided at an output side of the rotational vector calculation means, a system identification model correction value derived by the rotational vector calculation means is memorized in the learning function portion, a correction value to an error of the system identification model is learned, a learned value is inputted to the periodicity disturbance observer portion and multiplied by the identification model correction value to produce updated identification model correction value.

5. A periodicity disturbance suppression device as defined in claim 4, which is further characterized in that an identification model correction function portion is provided to the learning function portion, moving/changing of an operation point at the time when the system identification model correction value is stored is repeated by the identification model correction function portion, when the movement of the operation point is finished, a suppression control for the periodicity disturbance is turned ON, and when the suppression control is completed, the suppression control for the periodicity disturbance is turned OFF while storing the system identification model correction value.

6. A periodicity disturbance suppression device as claimed in claim 4, which is further characterized in that the learning function portion is provided with an interpolation correction means, so that the system identification model correction value after learning can have any frequency range.

7. A periodicity disturbance suppression device as claimed in claim 1, which is further characterized in that the phase correction amount calculation means, the gain correction amount calculation means and the rotatable vector calculation means are respectively provided with n-order components of the frequency of the periodicity disturbance.

8. A periodicity disturbance suppression device which is characterized by having:

a periodicity disturbance suppression means that has at an upstream part thereof a controller that issues a control command value, and a periodicity disturbance observer portion by which a frequency component of a periodicity disturbance of a suppression-controlled object, which is output of a controlled-object that produces the periodicity disturbance, is multiplied by a reversed system that is expressed by a reciprocal of a system identification model thereby to estimate a periodicity disturbance, the periodicity disturbance estimated by the periodicity disturbance observer portion being, as a compensation command value, subtracted from the above-mentioned control command value thereby to suppress the periodicity disturbance;

a phase calculation means that calculates a vector rotation angle that extends from a detected position before one period to a detected present position, as a phase error caused by an error of the system identification model, the vector rotation angle being defined with respect to a vector in which a vector trajectory drawn on a complex vector plane by each frequency component of the periodicity disturbance during the periodicity disturbance suppression control carried out by the periodicity disturbance suppression means shifts from the detected current position to an original position;

a gain calculation means that calculates a gain error by the error of the system identification model in accordance with a current value of the gain of a vector trajectory and a desired value of the gain of the vector trajectory, the vector trajectory being drawn on a complex vector plane by each frequency component of the periodicity disturbance during the periodicity disturbance suppression control carried out by the periodicity disturbance suppression means; and a correction command value calculation means that calculates a rotating vector, which is derived by multiplying together the phase error calculated by the phase calculation means and the gain error calculated by the gain calculation means, as a correction command value to the system identification model, wherein the system identification model is corrected by the correction command value calculated by the correction command value calculation means.

9. A periodicity disturbance suppression device as claimed in claim 8, which is further characterized in that the phase calculation means derives the rotation angle by adding a rotation angle that extends from a detected position of the vector trajectory before one period with respect to a vector viewed from the detected position before one period to a detected present position to another rotation angle that extends from the detected present position to an original position with respect to a vector viewed from the detected position before one period to the detected present position.

10. A periodicity disturbance suppression device as claimed in claim 8, which is further characterized in that the phase calculation means calculates the phase error by passing a difference between the rotation angle and a desired rotation angle through a PI controller and the gain calculation means calculates the gain error by passing a difference between the present value of the gain and a desired value through the PI controller.

11. A periodicity disturbance suppression device as claimed in claim 8, which is further characterized in that the phase calculation means, the gain calculation means and the correction command value calculation means are provided by a number of the order of the frequency component of the periodicity disturbance and a correction command value of the frequency component of each order is derived for correcting the system identification model.

12. A periodicity disturbance suppression method which is characterized by having:
   a periodicity disturbance suppression step that has at an upstream part of a control flow a controller that inputs a control command value and a periodicity disturbance observer portion that extracts from an output of a controlled-object a frequency component corresponding to a periodicity disturbance, the extracted frequency component being multiplied by a reversed system expressed by a reciprocal of a system identification model, thereby to estimate the periodicity disturbance, the estimated periodicity disturbance being, as a compensation command value, subtracted from the above-mentioned control command value for suppressing periodicity disturbance;
   a phase correction amount calculation step that derives a phase correction amount of a system model by inputting and calculating a trajectory provided when the frequency component of the periodicity disturbance obtained by the periodicity disturbance suppression step is drawn on a complex vector plane;
   a gain correction amount calculation step that derives a gain correction amount of the system model by inputting and calculating the frequency component of the periodicity disturbance obtained by the periodicity disturbance suppression step; and
   a rotational vector calculation step that calculates a system identification model correction value by multiplying together the phase correction amount from the phase correction amount calculation step and the gain correction amount from the gain correction amount calculation step, and corrects the system identification model of the periodicity disturbance suppression step based on the system identification model correction value.

13. A periodicity disturbance suppression method in which a controlled object is a motor, an output from the motor is inputted to the periodicity disturbance observer portion to estimate a periodicity disturbance, the estimated periodicity disturbance from the periodicity disturbance observer portion is, as a compensation command value, subtracted from the control command value to control the motor through an inverter, wherein:
   the phase correction amount calculation step calculates a phase of the vector trajectory that is drawn by the frequency component of the periodicity disturbance by inputting therein the output of the motor;
   the gain correction amount calculation step inputs therein the output of the motor to calculate a progress speed of the vector trajectory drawn by the frequency component of the periodicity disturbance, and compares the progress speed with a threshold value, and repeats the calculation and comparison for plural times to calculate a gain correction amount; and
   the rotational vector calculation step calculates the system identification model correction value by multiplying together the phase correction amount from the phase correction amount calculation means and the gain correction amount from the gain correction amount calculation means, and corrects the system identification model of the periodicity disturbance of the periodicity disturbance observer portion based on the system identification model correction value.

14. A periodicity disturbance suppression method which is characterized by having:
   a periodicity disturbance suppression step that has at an upstream part thereof a controller that issues a control command value, and a periodicity disturbance observer portion by which a frequency component of a periodicity disturbance of a suppression-controlled object, which is output of a controlled-object that produces the periodicity disturbance, is multiplied by a reversed system that is expressed by a reciprocal of a system identification model thereby to estimate a periodicity disturbance, the periodicity disturbance estimated by the periodicity disturbance observer portion being, as a compensation command value, subtracted from the above-mentioned control command value thereby to suppress the periodicity disturbance;
   a phase calculation step that calculates a vector rotation angle that extends from a detected position before one period to a detected present position, as a phase error caused by an error of the system identification model, the vector rotation angle being defined with respect to a vector in which a vector trajectory drawn on a complex vector plane by each frequency component of the periodicity disturbance during the periodicity disturbance suppression control carried out by the periodicity disturbance suppression means shifts from the detected current position to an original position;
   a gain calculation step that calculates a gain error by the error of the system identification model in accordance with a current value of the gain of a vector trajectory and a desired value of the gain of the vector trajectory, the vector trajectory being drawn on a complex vector plane by each frequency component of the periodicity disturbance during the periodicity disturbance suppression control carried out by the periodicity disturbance suppression means;
   a correction command value calculation step that calculates a rotating vector, which is derived by multiplying together the phase error calculated by the phase calculation means and the gain error calculated by the gain calculation means, as a correction commend value to the system identification model; and
   a step that corrects the system identification model by the calculated correction command value.

* * * * *